United States Patent
Nam et al.

(10) Patent No.: US 12,304,337 B2
(45) Date of Patent: May 20, 2025

(54) ELECTRIC VEHICLE CHARGING ROBOT

(71) Applicants: Hyundai Motor Company, Seoul (KR); Kia Corporation, Seoul (KR)

(72) Inventors: Ki Hoon Nam, Whasung-si (KR); Byung Ho Yoon, Whasung-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 814 days.

(21) Appl. No.: 17/530,073

(22) Filed: Nov. 18, 2021

(65) Prior Publication Data
US 2022/0153157 A1 May 19, 2022

(30) Foreign Application Priority Data

Nov. 19, 2020 (KR) .................... 10-2020-0156059
Sep. 27, 2021 (KR) .................... 10-2021-0127569

(51) Int. Cl.
*B60L 53/35* (2019.01)
*B25J 11/00* (2006.01)
*B60L 53/16* (2019.01)

(52) U.S. Cl.
CPC ............. *B60L 53/35* (2019.02); *B25J 11/008* (2013.01); *B60L 53/16* (2019.02)

(58) Field of Classification Search
CPC .......... B60L 53/35; B60L 53/16; B25J 11/008
USPC ........................................... 320/109
See application file for complete search history.

(56) References Cited

U.S. PATENT DOCUMENTS

| | | | |
|---|---|---|---|
| 4,544,121 A | 10/1985 | Komura | |
| 5,306,999 A | 4/1994 | Hoffman | |
| 5,314,293 A * | 5/1994 | Carlisle | B25J 19/063 |
| | | | 901/29 |
| 9,770,993 B2 * | 9/2017 | Zhao | B60L 53/51 |
| 9,815,377 B2 * | 11/2017 | Wu | B60L 53/65 |
| 10,668,631 B2 | 6/2020 | Rueb | |
| 2013/0076902 A1 * | 3/2013 | Gao | B25J 9/042 |
| | | | 348/148 |
| 2013/0157501 A1 * | 6/2013 | Ishii | F16M 11/14 |
| | | | 439/527 |

(Continued)

FOREIGN PATENT DOCUMENTS

| | | |
|---|---|---|
| EP | 3626411 A1 | 3/2020 |
| GB | 2481249 A | 12/2011 |
| KR | 10-1075994 B1 | 10/2011 |

(Continued)

*Primary Examiner* — Richard V Muralidar
(74) *Attorney, Agent, or Firm* — Morgan, Lewis & Bockius LLP (57) ABSTRACT

An electric vehicle charging robot configured for absorbing an external disturbance to prevent a damage of the electric vehicle charging robot and an electric vehicle, includes a charging connector engageable to a charging inlet of an electric vehicle to supply electric power to the electric vehicle. The electric vehicle charging robot apparatus includes: a body frame extending in a vertical direction and including a vertical support of which an upper end portion is movable upward and downward; a multi-joint link unit of a SCARA type coupled to an upper side of the body frame and including a plurality of link arms each of which is movable and rotatable in a horizontal direction; and a flexible joint unit disposed between an end portion of the multi-joint link unit and the charging connector.

17 Claims, 5 Drawing Sheets

(56) References Cited

U.S. PATENT DOCUMENTS

2013/0221177 A1    8/2013  Ishii et al.
2015/0042278 A1*   2/2015  Leary .................. B60L 1/02
                                                    901/30

FOREIGN PATENT DOCUMENTS

KR      10-2014-0121572 A    10/2014
KR         10-2015796 B1      8/2019

* cited by examiner

ELECTRIC VEHICLE CHARGING ROBOT

CROSS-REFERENCE TO RELATED APPLICATION

The present application claims priority to Korean Patent Application Nos. 10-2020-0156059 filed on Nov. 19, 2020, and 10-2021-0127569 filed on Sep. 27, 2021, with the Korean Intellectual Property Office (KIPO), the entire contents of which is incorporated herein for all purposes by this reference.

BACKGROUND OF THE INVENTION

Field of the Invention

The present invention relates to an electric vehicle charging device and to an electric vehicle charging device having multiple joint links to allow a movement of an end portion of a charger.

Description of Related Art

When charging an electric vehicle by an electric vehicle charging device of a conductive charging scheme, a vehicle coupler attached to a front end portion of a charging cable is drawn out from a charger and moved and/or rotated to extend to the electric vehicle and then the connector is coupled the vehicle's inlet, and then power is transferred to the electric vehicle. A robot device may be used to facilitate the movement and support of the cable and the vehicle coupler.

However, a robot arm of the electric vehicle charging system (hereinbelow, referred to as "electric vehicle charging robot") may experience various disturbances during a charging session unlike a general robot. The disturbances may include getting on or off of an occupant or a passenger, loading and unloading of luggage, external shocks, and vibrations. An arrangement for responding flexibly to the disturbances is required because a failure to adequately respond to the disturbances may cause a damage of the electric vehicle charging robot and/or the electric vehicle and even an injury to a charging worker or a driver.

In general, a multiple-joint robot cannot respond to the disturbances, in real time, which may occur during the charging session since each joint in the multiple-joint robot has a high reduction ratio and its backdrivability is low when an external force is applied. A decrease in the reduction ratio of robot joints for enhancing backdriveability may make the motors larger and the dimension of the robot larger.

A virtual backdrivability may be provided to the robot when the disturbance occurs by use of an active control technique such as a visual servoing and an impedance control. However, the techniques may have low reliability, be error-prone, and show a slow response speed making it difficult to respond to an abrupt displacement in real time. A typical Selective Compliance Assembly Robot Arm (SCARA) robot structure may provide the backdrivability for a motion in a horizontal plane (i.e., in an x-y plane), but does not provide the backdrivability for a motion in a vertical plane (i.e., a plane parallel with a z-axis). Furthermore, the typical SCARA robot cannot respond to inclinations in various directions such as a rolling, a pitching, and a yawing which may occur during the charging session.

An elastic member such as a spring may be added to the robot to enhance the flexibility for the rolling, the pitching, and the yawing, which however may reduce a rigidity of the robot and deteriorate a precision in the robot operation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an electric vehicle charging robot configured for absorbing an external disturbance to prevent a damage of the electric vehicle charging robot and an electric vehicle coupled to the electric vehicle charging robot when there occurs a disturbance which cause an unwanted movement of the electric vehicle due to a getting on or off of an occupant or a passenger or a loading or unloading of luggage while the electric vehicle is being charged in a state of being coupled to the electric vehicle charging robot.

According to an aspect of various exemplary embodiments of the present invention, an electric vehicle charging robot apparatus has a charging connector engageable to a charging inlet of an electric vehicle to supply electric power to the electric vehicle. The electric vehicle charging robot apparatus includes: a body frame extending in a vertical direction and including a vertical support of which an upper end portion is movable upward and downward; a multi-joint link unit of a SCARA type coupled to an upper side of the body frame and including a plurality of link arms each of which is movable and rotatable in a horizontal direction; and a flexible joint unit disposed between an end portion of the multi-joint link unit and the charging connector.

The flexible joint unit may have a three-axis rotational degree of freedom to enable the charging connector to move to and be engaged with the charging inlet of the electric vehicle.

The flexible joint unit may include: a cam base formed with a plurality of cams indented from a surface of the cam base; a cap disposed to face the cam base; and a plurality of cam followers, each of the cam followers being provided to correspond to each of the cams.

The flexible joint unit may further include a plurality of springs, each of the springs having a first end portion configured to support each of the cam followers and a second end portion supported by the cap.

The body frame may include a gravity compensator configured to prevent an abrupt going up or down of the vertical support while facilitating an upward or downward movement of the vertical support.

The gravity compensator may include a counter balance provided between the vertical support and a base plate of the electric vehicle charging robot apparatus.

The gravity compensator may include a static load spring provided between the vertical support and a base plate of the electric vehicle charging robot apparatus.

The charging connector may include a camera configured to take an image of a coupling portion of the charging connector and the charging inlet of the electric vehicle to enable to check a coupling state between the charging connector and the charging inlet of the electric vehicle during a charging session.

The multi-joint link unit of the SCARA type may include a reducer configured to connect two link arms with a rotational speed ratio other than one.

The electric vehicle charging robot apparatus may further include a processor and a memory storing program instructions executable by the processor. The program instructions, when executed by the processor, may cause the processor to control the multi-joint link unit.

The program instructions may control the multi-joint link unit to move the charging connector so that the charging connector is automatically coupled with the charging inlet of the electric vehicle.

According to another aspect of various exemplary embodiments of the present invention, an electric vehicle charging robot apparatus has a charging connector engageable to a charging inlet of an electric vehicle to supply electric power to the electric vehicle. The electric vehicle charging robot apparatus includes a body frame extending in a vertical direction thereof. The body frame includes: a vertical support of which an upper end portion is movable upward and downward; and a gravity compensator configured to prevent an abrupt going up or down of the vertical support while facilitating an upward or downward movement of the vertical support.

The gravity compensator may include a counter balance provided between the vertical support and a base plate of the electric vehicle charging robot apparatus.

The gravity compensator may include a static load spring provided between the vertical support and the base plate of the electric vehicle charging robot apparatus.

According to yet another aspect of various exemplary embodiments of the present invention, an electric vehicle charging robot apparatus includes: a multi-joint link unit of a SCARA type including a plurality of link arms each of which is movable and rotatable in a horizontal direction; a charging connector disposed at an end portion of the multi joint link unit and engageable to a charging inlet of an electric vehicle to supply electric power to the electric vehicle; and a flexible joint unit disposed between an end portion of the multi-joint link unit and the charging connector.

The flexible joint unit may have a three-axis rotational degree of freedom to enable the charging connector to move to and be engaged with the charging inlet of the electric vehicle.

The flexible joint unit may include: a cam base formed with a plurality of cams indented from a surface of the cam base; a cap disposed to face the cam base; and a plurality of cam followers, each of the cam followers being provided to correspond to each of the cams.

The flexible joint unit may further include a plurality of springs, each of the springs having a first end portion configured to support each of the cam followers and a second end portion supported by the cap.

The charging connector may include a camera configured to take an image of a coupling portion of the charging connector and the charging inlet of the electric vehicle to enable to check a coupling state between the charging connector and the charging inlet of the electric vehicle during a charging session.

The electric vehicle charging robot apparatus may further include a processor and a memory storing program instructions executable by the processor. The program instructions, when executed by the processor, may cause the processor to control the multi-joint link unit.

According to various exemplary embodiments of the present invention, the electric vehicle charging robot may flexibly responds to the disturbance caused by the movement of the electric vehicle, which makes it possible for the occupant or the passenger to safely get on or off the electric vehicle or to load or unload luggage while the electric vehicle is being charged.

Various exemplary embodiments of the present invention may give a freedom of getting on or off the electric vehicle to the occupant of the electric vehicle while the electric vehicle is being charged. A driver of an electric vehicle that transports goods such as a freight truck may load and unload goods while the vehicle is being charged to utilize the charging time, which may enhance a utility of the electric vehicle in the cargo field.

Furthermore, the camera attached to the charging connector may facilitate an actuation of the charging robot and may enable to check the coupling state of the inlet of the electric vehicle and the charging connector of the charging robot in real time and take an action for a potential disconnection which may occur during the charging session thereby preventing a safety accident and improving a reliability of the electric vehicle. Furthermore, the camera provided at the charging connector and the motors provided in the multi-joint link unit facilitate an automatic actuation of the charging robot, which may reduce charging man-hours and greatly improve user convenience.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The terminologies including ordinals such as "first" and "second" designated for explaining various components in the exemplary embodiment are used to discriminate a component from the other ones but are not intended to be limiting to a specific component. For example, a second component may be referred to as a first component, and similarly, a first component may further be referred to as a second component without departing from the scope of the present invention. As used herein, the term "and/or" may include a presence of one or more of the associated listed items and any and all combinations of the listed items.

In various exemplary embodiments of the present invention, expressions "at least one of A and B" and "at least one of A or B" may mean a group consisting of: "A", "B", or "both A and B". Further, expressions "one or more of A and B" and "one or more of A or B" may mean a group consisting of: "A", "B", or "both A and B".

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is no intervening object between the components. Other words used to describe the relationship between elements should be interpreted in a similar fashion.

The terminologies are used herein for the purpose of describing exemplary embodiments only and are not intended to limit the present invention. The singular forms include plural referents as well unless the context clearly dictates otherwise. Further, the expressions "comprises," "includes," "constructed," "configured" are used to refer a presence of a combination of stated features, numbers, processing steps, operations, elements, or components, but are not intended to preclude a presence or addition of another feature, number, processing step, operation, element, or component.

Spatially relative terms such as "below", "beneath", "lower", "above", "upper", and the like may be used to easily describe a relative position or direction with respect to a component. The terms, however, should not be regarded to designate an absolute position or direction of related objects. For example, when a component shown in the drawing is turned over, a component described to be placed "below" or "beneath" another component may be placed "above" or "on" the other component. Accordingly, the preposition "below", for example, may include both directions of "below" and "above". Thus, the prepositions of places and direction usage may also be constructed to indicate another positions or directions, and the components in the descriptions of positions and directions may be constructed to be in the other positions and directions or orientations.

Unless defined otherwise, all terms used herein, including technical or scientific terms, have the same meaning as commonly understood by those of ordinary skill in the art to which various exemplary embodiments of the present invention pertains. Terms such as those defined in a commonly used dictionary should be interpreted as having meanings consistent with their meanings in the context of related literatures and will not be interpreted as having ideal or excessively formal meanings unless explicitly defined in the present application.

Exemplary embodiments of the present invention will now be described in detail with reference to the accompanying drawings. In the following description and the accompanied drawings, detailed descriptions of well-known functions or configuration which may obscure the subject matter of the present invention will be omitted for simplicity. Further, it is to be noted that the same components are designated by the same reference numerals throughout the drawings.

Figure 1:
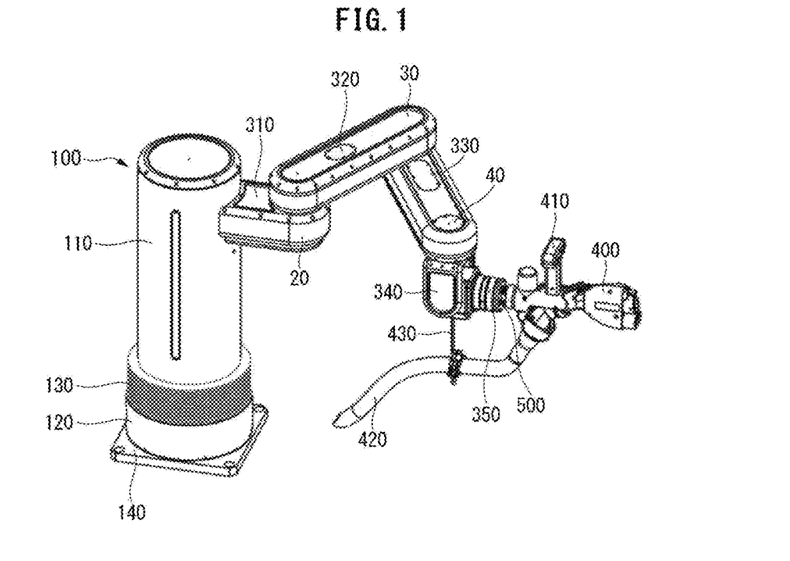
FIG. 1 is a perspective view of an electric vehicle charging robot according to various exemplary embodiments of the present invention.
Figure 2:
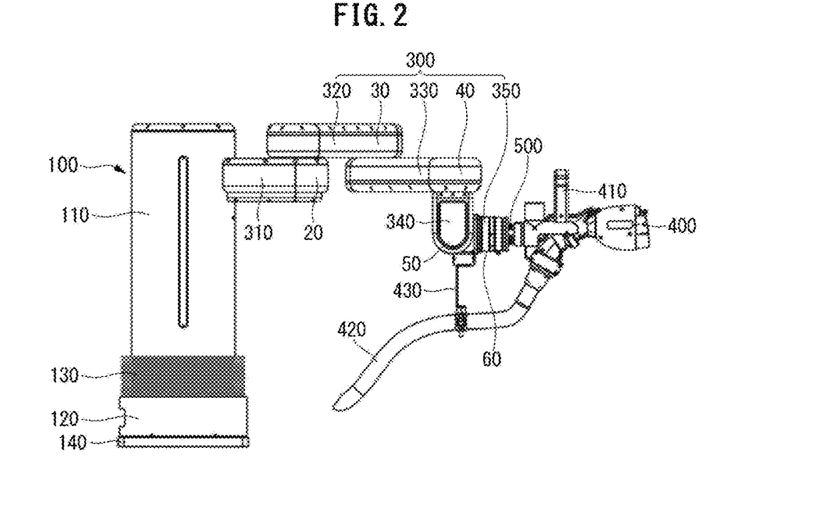
FIG. 2 is a lateral view of the electric vehicle charging robot according to various exemplary embodiments of the present invention.

FIG. 1 is a perspective view of an electric vehicle charging robot 1 according to various exemplary embodiments of the present invention, and FIG. 2 is a lateral view of the electric vehicle charging robot 1 according to various exemplary embodiments of the present invention.

The electric vehicle charging robot 1, which may support a charging cable 420 supplying electric power to the electric vehicle and facilitate a handling of the charging cable 420 for a movement of the charging cable 420, may include a body frame 100, a multiple-joint link unit 300 connected to and supported by an upper side of the body frame 100, and a charging connector 400 connected to an outer end of the multiple joint link unit 300 through a flexible joint unit 500.

The body frame 100 may include an upper housing 110 and a lower housing 120. The upper housing 110 may be raised and lowered with respect to the lower housing 120 by an elevating device 200 provided inside the body frame 100. The upper housing 110 and the lower housing 120 may be coupled to each other by a connecting member having an extensible or retractable structure or material such as a bellows, allowing the displacement of the upper housing 110 with respect to the lower housing 120.

Figure 3:
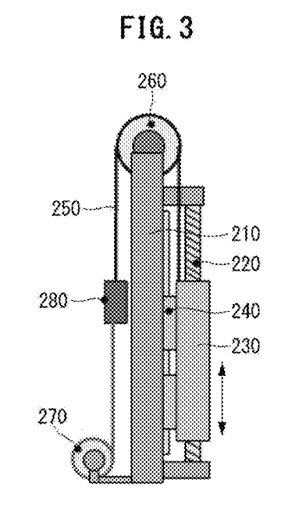
FIG. 3 is an illustration of an elevating device of the electric vehicle charging robot according to various exemplary embodiments of the present invention.

FIG. 3 is a vertical cross-sectional view the elevating device 200 of the electric vehicle charging robot according to various exemplary embodiments of the present invention. For convenience, the upper housing 110 and the lower housing 120 are not shown in FIG. 3. The elevating device 200 shown in the drawing is configured as a first joint 10 of the multiple joint link unit 300.

A vertical support 210 is provided to extend in a vertical direction in a center portion of the body frame 100. On one side of the vertical support 210, provided are a ball screw 220 extending in a direction parallel to the vertical support 210 and a slider 230 movable upward and downward along the ball screw 220 by a rotation of the ball screw 220. The slider 230 may move upward and downward along the ball screw 220 while being supported by a linear motion (LM) guide 240.

One end portion of a wire 250 is coupled to an upper end portion of the slider 230. The wire 250 extends to a side of the vertical support 210 opposite to the slider 230 via a pulley 260 rotatably provided on an upper end portion of the vertical support 210 and has other end portion fixed around a base plate 140. A static load spring 270 is provided adjacent to the other end portion of the wire 250, and a counter balance 280 is provided at a point on the wire 250. The static load spring 270, which is a long leaf spring bent with a certain curvature, may apply a restoring force independent of a stroke to the wire 250 so that the slider 230 and the upper housing 110 move up and down smoothly.

The vertical support 210 may be attached or coupled to the lower housing 120 or the base plate 140, and the slider 230 may be coupled to the upper housing 110. Therefore, as the wire 250 moves, the slider 230 may move upward or downward and the upper housing 110 may also be raised and lowered. The vertical movement of the upper housing 110 is accompanied by the movement of all links and joints coupled sequentially and the charging connector 400 as well.

The static load spring 270 and the counter balance 280 form a gravity compensator that compensates for a gravity applied to the wire 250 through the slider 230 according to a self-weight of the electric vehicle charging robot and the external force applied to the electric vehicle charging robot. In case that the gravity compensation is performed using only the static load spring 270 alone, the weight of the system may be reduced but a compensation error may occur. In contrast, when only the counter balance 280 is used alone, there may be little compensation error but the weight of the overall system may increase. The electric vehicle charging robot according to various exemplary embodiments of the present invention include a hybrid gravity compensator which employs both the static load spring 270 and the counter balance 280 to improve an accuracy of the gravity compensation while reducing a size and weight of the system. Furthermore, the hybrid gravity compensator enables to respond in real-time to disturbances occurring while the electric vehicle charging robot is raised or lowered before or after the charging session.

Although not shown in the drawings, a motor, a timing pulley suitable for transferring power of the motor, and a belt may be additionally provided in a lower portion of the body frame. In that case that the vertical stroke of the electric vehicle charging robot is large, additional gravity compensation may be implemented by use of the motor.

Referring back to FIG. 1, the multiple joint link unit 300 may include a first joint provided inside the body frame 100, a first link 310 extending outwardly from an upper side of the body frame 100, a second link 320 coupled to the first link 310 through a second joint 20 to be rotatable and movable in the horizontal direction with respect to the first link 310, a third link 330 coupled to the second link 320 through a third joint 30 to be rotatable and movable in the horizontal direction with respect to the second link 320, a fourth link 340 coupled to a lower side of an outer end of the third link 330 through a fourth joint 40 to be rotatable about a vertical axis, and a fifth link 350 coupled to a side of the fourth link 340 through a fifth joint 50 and extending in the horizontal direction and having a sixth joint 60 allowing the coupling of the flexible joint unit 500. In various exemplary embodiments of the present invention, the members of the multiple-joint link unit 300 may be mechanically coupled to be movable by an external force exerted by a human operator. Alternatively, however, the members of the multiple-joint link unit 300 may be electrically connected to be movable by motors in response to control commands of the system.

Figure 4:
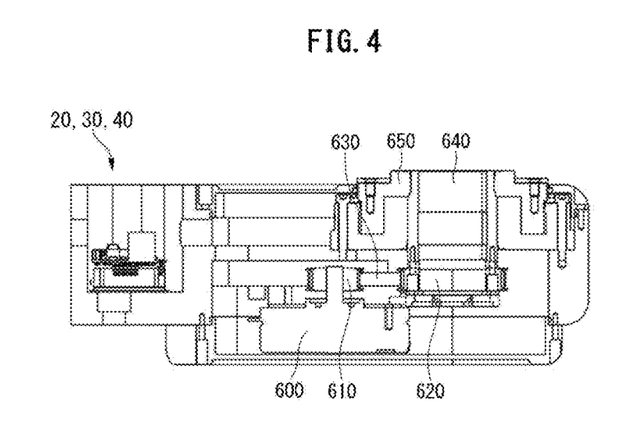
FIG. 4 is a cross-sectional view of one of the second through fourth joints of the electric vehicle charging robot according to various exemplary embodiments of the present invention.

FIG. 4 is a cross-sectional view of one of the second through fourth joints 20, 30, and 40. Each of the joints 20, 30, and 40 may include a motor 600, a first and a second timing pulleys 610 and 620, a belt 630, and a reducer 640. The first through fourth links 310, 320, 330, and 340 are connected sequentially through the second through fourth joints 20, 30, and 40. The joints 20, 30, and 40 may further include an input port 540 and an output port 550 configured for receiving respective links.

The first timing pulley 610 may be positioned to receive the power of the motor 600 directly. For example, the first timing pulley 610 may be shaft-coupled to the motor 600. The second timing pulley 620 may be coupled to the reducer 640. The belt 630 may engage with the first timing pulley 610 and the second timing pulley 620. Accordingly, the power of the motor 600 transferred to the first timing pulley 610 may be delivered to the reducer 640 through the belt 630 and the second timing pulley 620.

The reducer 640 reduces an output rotation speed than a rotation speed of the motor 600 while increasing a torque. The reducer 640 may be implemented by a Harmonic Drive reducer, for example, provided by Harmonic Drive LLC ('Harmonic Drive' is a trademark of Harmonic Drive LLC). The Harmonic Drive reducer is advantageous in that it is light in weight, has a high reduction ratio, has a simple structure, does not have a backlash, and enables a very precise control. If the reverse driving torques of the second through fourth joints 20, 30, and 40 are designed to be smaller than a threshold value in consideration of a reverse driving torque of the reducer 640 and a reduction ratio between the first and second timing pulleys 610 and 620, it is possible to respond flexibly when an external force is applied to the multiple-joint link unit 300 in the horizontal direction.

Figure 5:
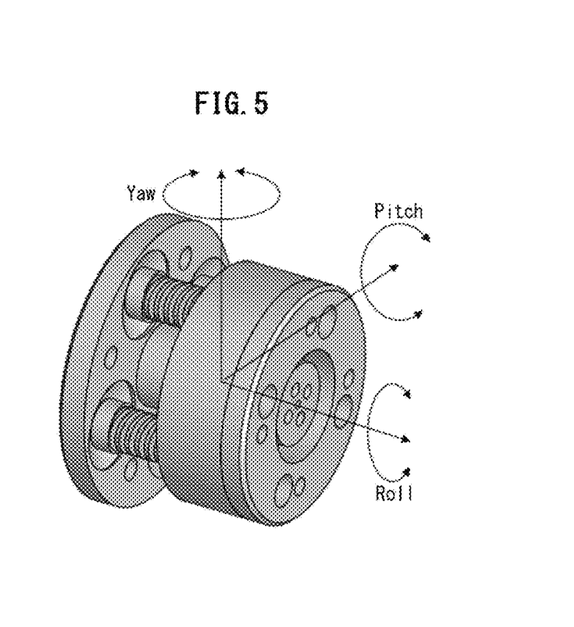
FIG. 5 is a perspective view of a flexible joint unit of an electric vehicle charging robot according to various exemplary embodiments of the present invention.
Figure 6:
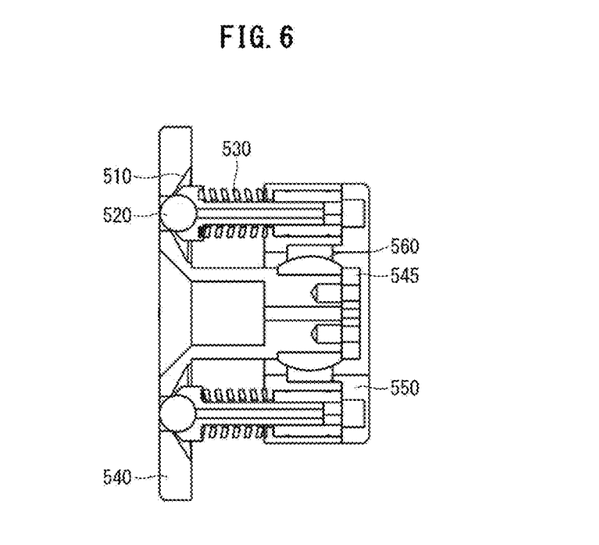
FIG. 6 is a cross-sectional view of the flexible joint unit of the electric vehicle charging robot according to various exemplary embodiments of the present invention.

FIG. 5 is a perspective view of the flexible joint unit 500 according to various exemplary embodiments of the present invention, and FIG. 6 is a cross-sectional view of the flexible joint unit 500 according to various exemplary embodiments of the present invention. The flexible joint unit 500 may include a cam base 540 disposed on one side, a post 545 extending in a vertical direction from a center of the cam base 540, and a cap 550 disposed to surround an upper end portion of the post 545 and face the cam base 540. A spherical bearing 570 is provided between the post 545 and the cap 550. A plurality of cams 510 cut to be indented are formed on a surface of the cam base 540 facing the cap 550. A cam follower 520 is provided for each of the plurality of cams 510. The plurality of cam followers 520 are supported by a plurality of springs 530. In detail, each cam follower 520 is supported by one end portion of a corresponding spring 530, and the other end portion of the spring 530 is supported by the cap 550. In various exemplary embodiments of the present invention, the cams 510, the cam followers 520, and the springs 530 may be provided by four, but the present invention is not limited thereto.

Figure 7A:
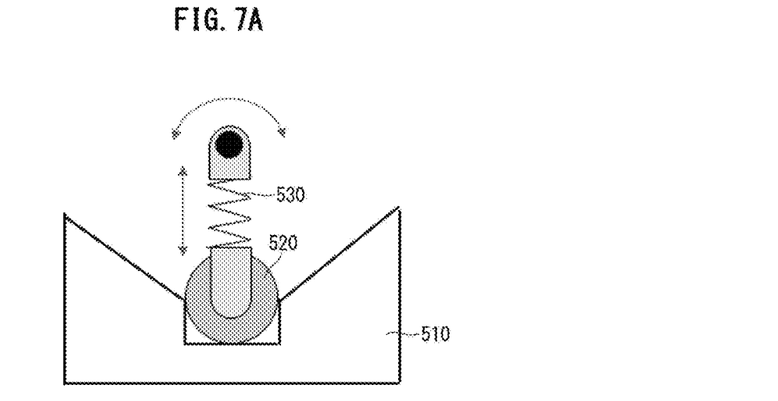
FIG. 7A illustrates a state of a cam follower in case that no external force is applied to the flexible joint unit of the electric vehicle charging robot according to various exemplary embodiments of the present invention.
Figure 7B:
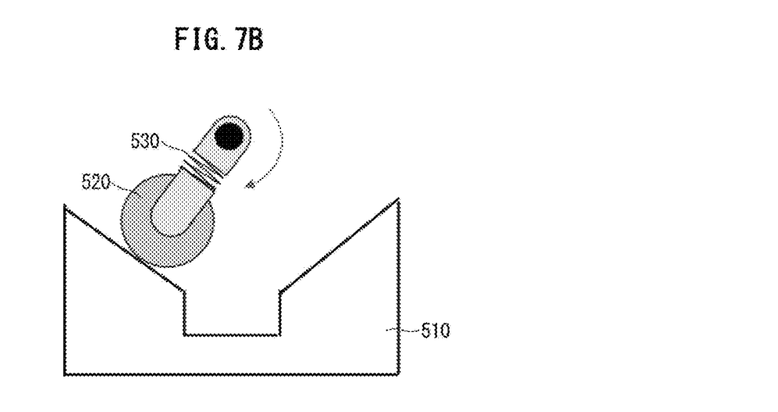
FIG. 7B illustrates a state of the cam follower in case that an external force is applied to the flexible joint unit of the electric vehicle charging robot according to various exemplary embodiments of the present invention.

FIG. 7A and FIG. 7B are views for explaining the operation of the flexible joint unit 500, in which FIG. 7A illustrates a state that no external force is applied to the flexible joint unit 500 and FIG. 7B illustrates a state that an external force is applied to the flexible joint unit 500. Referring to FIG. 7A, when there is no disturbance or external force applied to the flexible joint unit 500, the cam follower 520 is positioned in a recess of the cam 510 and supported by an elastic force of the spring 530. Thus, the flexible joint unit 500 may maintain a rigid state, and a precise performance of the robot may be guaranteed. On the other hand, when a disturbance or external force is applied to the flexible joint unit 500, the cam follower 520 may move away from the recess of the cam 510 to buffer and absorb the disturbance. As a result, the flexible joint unit 500 may provide the flexibility in the flexible joint unit 500 to prevent damages of the robot and the electric vehicle even though the rigidity and precision may be lowered temporarily.

The flexible joint unit 500 according to an exemplary embodiment shown in FIG. 5 may be a mechanical device which does not employ a sensor, an actuator, and a controller, and may be implemented in a simple configuration. The flexible joint unit 500 may solidly and elastically support the members coupled on both sides of the flexible joint unit 500 owing to a buffering structure including the spherical bearing 570, the spring 530, and the cam follower 520. Thus, the flexible joint unit 500 may effectively respond to three-axis rotational disturbances such as the rolling, pitching, and yawing which may be induced on the electric vehicle during the charging process.

A threshold point at which the flexible joint unit 500 operates may be adjusted by changing the spring 530 or a three-dimensional profile of the cam 510. Thus, the electric vehicle charging robot may be applicable to various charging stations by changing the threshold point according to the specification of the charging station and a weight of the cable. Furthermore, in case that the flexible joint unit 500 is implemented in a mechanical device which does not employ an actuator or a controller, the flexible joint unit 500 may have a simple configuration while being configured for responding to the disturbances.

Referring back to FIG. 1, the charging connector 400 is coupled to the external end portion of the fifth link 350 through the flexible joint unit 500. The charging connector 400 is provided with a camera 410 for photographing a coupling portion of the charging connector 400 and the inlet of the vehicle to check the state of the charging connector 400 and the inlet of the vehicle during the charging process. The charger cable 420 may connected to the charging connector 400 to supply the electric power to the electric vehicle via the charging connector 400.

Meanwhile, a charging cable holder 430 suspended from the fourth link 340 may support the charging cable 430 in a condition of being spaced from ground by a predetermined height or more to allow a movement of the cable 420 without being disturbed by objects which may exist on the ground and distribute the weight of the cable 420 which may be concentrated to the charging connector 400 otherwise. Furthermore, the charging cable holder 430 may prevent the charging cable 420 from being worn due to a friction with the ground, improving a safety and durability.

Figure 8:
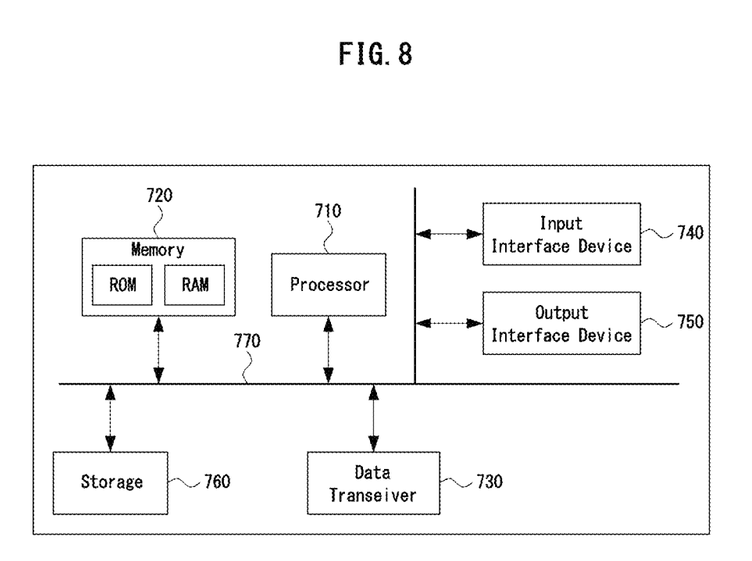
FIG. 8 is a block diagram of an electric vehicle charging robot according to various exemplary embodiments of the present invention.

FIG. 8 is a block diagram of an electric vehicle charging robot according to various exemplary embodiments of the present invention The electric vehicle charging robot according to the exemplary embodiment may include at least one processor 710, a memory 720 storing program instructions to be executed by the processor 710 and a result of an instruction execution, and a storage 760. The program instructions stored in the storage 760 may be configured to detect relative position of the charging inlet with respect to the charging connector 400 based on an image acquired by the camera 410, control the multi joint link unit 300 and the flexible joint unit 500 to move such that the charging connector 400 is automatically coupled with the charging inlet. The electric vehicle charging robot may further include an input interface device 740, an output interface device 750, and a data transceiver 730. The components of the electric vehicle charging robot may be connected to each other by a bus 770.

The processor 710 may execute program instructions stored in the memory 720 or the storage 760. The processor 710 may include a central processing unit (CPU) or a graphics processing unit (GPU), or may be implemented by another kind of dedicated processor suitable for performing the method of the present invention. The memory 720 may load the program instructions stored in the storage 760 to provide to the processor 710 so that the processor 710 may execute the program instructions. The memory 720 may include, for example, a volatile memory such as a read only memory (ROM) and a nonvolatile memory such as a random access memory (RAM).

The storage 760 may include an intangible recording medium suitable for storing the program instructions, data files, data structures, and a combination thereof. Examples of the storage medium may include magnetic media such as a hard disk, a floppy disk, and a magnetic tape, optical media such as a compact disk read only memory (CD-ROM) and a digital video disk (DVD), magneto-optical medium such as a floptical disk, and semiconductor memories such as ROM, RAM, a flash memory, and a solid-state drive (SSD).

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code which may be executed by a computer using an interpreter or the like. In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electric vehicle charging robot apparatus having a charging connector engageable to a charging inlet of an electric vehicle to supply electric power to the electric vehicle, the electric vehicle charging robot apparatus comprising:
    a body frame extending in a vertical direction and including a vertical support of which an upper end portion is movable upward and downward;
    a multi-joint link unit coupled to an upper side of the body frame and including a plurality of link arms each of which is movable and rotatable in a horizontal direction; and
    a flexible joint unit disposed between an end portion of the multi-joint link unit and the charging connector, and including at least one buffering structure that buffers and absorbs a disturbance or an external force to respond the distirbance or the external force during an electrically charging process, wherein the disturbance or the external force includes at least one of rolling, pitching, or yawing.

2. The electric vehicle charging robot apparatus of claim 1, wherein the flexible joint unit has a three-axis rotational degree of freedom to enable the charging connector to move to and be engaged with the charging inlet of the electric vehicle.

3. The electric vehicle charging robot apparatus of claim 2, wherein the at least one buffering structure of the flexible joint unit includes:
    a cam base formed with a plurality of cams indented from a surface of the cam base;
    a cap disposed to face the cam base; and
    a plurality of cam followers, each of the cam followers being provided to correspond to each of the cams.

4. The electric vehicle charging robot apparatus of claim 3, wherein the flexible joint unit further includes:
    a plurality of springs, each of the springs having a first end portion configured to support each of the cam followers and a second end portion supported by the cap.

5. The electric vehicle charging robot apparatus of claim 1, wherein the body frame includes:
    a gravity compensator configured to prevent an abrupt going up or down of the vertical support while facilitating an upward or downward movement of the vertical support.

6. The electric vehicle charging robot apparatus of claim 5, wherein the gravity compensator includes:
    a counter balance provided between the vertical support and a base plate of the electric vehicle charging robot apparatus.

7. The electric vehicle charging robot apparatus of claim 5, wherein the gravity compensator includes:
    a static load spring provided between the vertical support and a base plate of the electric vehicle charging robot apparatus.

8. The electric vehicle charging robot apparatus of claim 1, wherein the charging connector includes:
    a camera configured to take an image of a coupling portion of the charging connector and the charging inlet of the electric vehicle to enable to check a coupling state between the charging connector and the charging inlet of the electric vehicle during a charging session.

9. The electric vehicle charging robot apparatus of claim 1, wherein the multi-joint link unit includes:
    a reducer configured to connect two link arms with a rotational speed ratio other than one.

10. The electric vehicle charging robot apparatus of claim 8, further including:
    a processor; and
    a memory storing program instructions executable by the processor,
    wherein the program instructions, when executed by the processor, are configured to cause the processor to control the multi-joint link unit.

11. The electric vehicle charging robot apparatus of claim 10, wherein the program instructions are configured to control the multi-joint link unit to move the charging connector so that the charging connector is automatically coupled with the charging inlet of the electric vehicle.

12. An electric vehicle charging robot apparatus, comprising:
    a multi-joint link unit including a plurality of link arms each of which is movable and rotatable in a horizontal direction;
    a charging connector disposed at an end portion of the multi-joint link unit and engageable to a charging inlet of an electric vehicle to supply electric power to the electric vehicle; and
    a flexible joint unit disposed between an end portion of the multi-joint link unit and the charging connector and including at least one buffering structure that buffers and absorbs a disturbance or an external force to respond the disturbance or the external force during an electrically charging process, wherein the disturbance or the external force includes at least one of rolling, pitching, or yawing.

13. The electric vehicle charging robot apparatus of claim 12, wherein the flexible joint unit has a three-axis rotational degree of freedom to enable the charging connector to move to and be engaged with the charging inlet of the electric vehicle.

14. The electric vehicle charging robot apparatus of claim 13, wherein the at least one buffering structure of the flexible joint unit includes:
- a cam base formed with a plurality of cams indented from a surface of the cam base;
- a cap disposed to face the cam base; and
- a plurality of cam followers, each of the cam followers being provided to correspond to each of the cams.

15. The electric vehicle charging robot apparatus of claim 14, wherein the flexible joint unit further includes:
- a plurality of springs, each of the springs having a first end portion configured to support each of the cam followers and a second end portion supported by the cap.

16. The electric vehicle charging robot apparatus of claim 12, wherein the charging connector includes:
- a camera configured to take an image of a coupling portion of the charging connector and the charging inlet of the electric vehicle to enable to check a coupling state between the charging connector and the charging inlet of the electric vehicle during a charging session.

17. The electric vehicle charging robot apparatus of claim 16, further including:
- a processor; and
- a memory storing program instructions executable by the processor,
- wherein the program instructions, when executed by the processor, are configured to cause the processor to control the multi-joint link unit.

* * * * *